July 27, 1954  J. J. FERNANDEZ  2,684,882
PISTON RING
Filed June 15, 1953

INVENTOR
JOHN J. FERNANDEZ
BY
ATTORNEY

Patented July 27, 1954

2,684,882

UNITED STATES PATENT OFFICE 2,684,882

PISTON RING

John J. Fernandez, Baltimore, Md., assignor of one-half to George S. Renard, Baltimore, Md.

Application June 15, 1953, Serial No. 361,523

3 Claims. (Cl. 309—24)

This invention relates to a new piston ring comprising an inner and outer ring, both of which are transversely split to be expansible.

The inner ring is designed to fit within the groove of the piston and it has a continuous inner peripheral wall which is circumferentially flexible at the base of a circumferential groove formed in the face of the ring. The groove goes sufficiently close to the inner periphery of the ring to make it possible to spread the sides of the ring apart upon the outer triangular wedging ring, the outer broad face of which contacts the cylinder wall and the inner wedging edges of which fit within the groove of the inner ring. The angle between the wedging sides of the outer ring is greater than the angle between the sides of the groove of the inner ring so that always a wedging action is exerted upon the sides of the inner ring by outward radial pressure of that ring on the outer ring. By this construction a tight seal between the cylinder and ring is always obtained and also a tight seal of the ring with the piston is always present, so that no compression is lost by gas escaping around the ring on the compression stroke or power on the explosion stroke of the piston. Should gas so escape around the ring it always carries carbon which tends to prevent the proper action of the ring. The ring of this invention keeps carbon out of the piston groove.

With the above and other objects in view which will be apparent from the following description, the invention is illustrated in the accompanying drawings in which.

Figure 1:
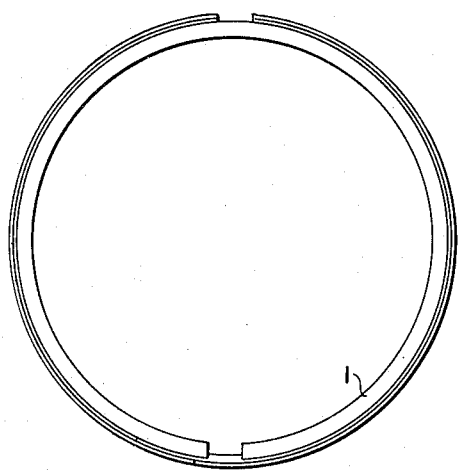
Figure 1 is a plan view of the assembled compression ring.
Figure 2:
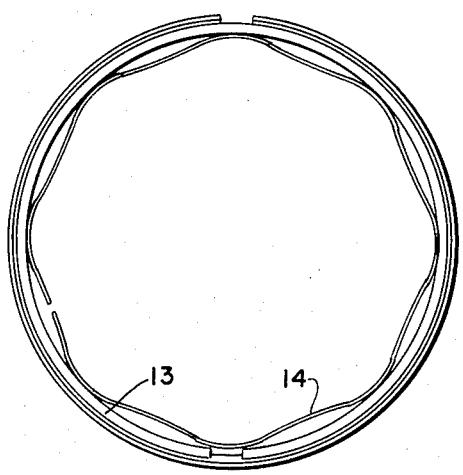
Figure 2 is a similar view of a similar ring shown with a conventional spring ring expander.
Figure 3:
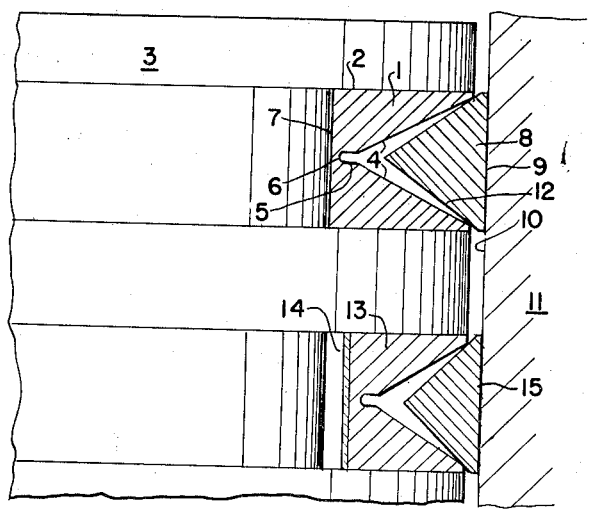
Figure 3 is a sectional view of a piston within a cylinder showing two of the rings in operation.

Similar numerals refer to similar parts throughout the several views. The inner compression ring 1 is formed to fit within the groove 2 of the piston 3. The upper inner ring is placed within the cylinder under outward tension to expand it toward the cylinder wall. This ring has a groove with converging sides 4 which preferably converge to the straight portion 5 and then to the arc of the circle 6 adjacent the inner periphery 7 of the inner ring. When the groove 2 of the piston wears, the groove between the sloping sides 4 of the ring may be spread, that is the ring bends angularly circumferentially at the apex of its groove. This bending or expanding of the ring 1 circumferentially at its outer perimeter seals the edge of the ring against the piston groove.

This spreading of the inner ring is effected by its outward tension on the outer ring 8 which is triangularly shaped with the base 9 of the triangle contacting the inner surface 10 of the cylinder 11, the wedging sides 12 of the triangle join each other at an angle greater than the angle between the sides 4 of the inner ring, so that the inner ring 1 always exerts a spreading action against the sides of the outer wedging ring 8 when the inner ring is forced radially outwardly. The outer ring 8 is preferably constructed with a face wider than the inner ring groove so that this wedging action between the rings will be maintained by contact of the outer ring with the cylinder. The outer ring 8 is under no opening tension but is intended to securely surround the inner ring at all times.

On new motors, all the rings will be like that described. But on worn cylinders, rings like those above described are used for the top ring, where heat on the piston head is greatest, but the next ring may use a spring expander, both to avoid piston slap and to form a tight oil seal. Greater outward pressure may be obtained with the ring expander than with the inner ring of this invention under tension, especially where the heat on the piston head is great.

This lower piston ring for worn cylinders is constructed quite similarly to the upper piston ring. The lower piston ring 13 illustrated is under no opening tension but its tension against the cylinder walls is maintained primarily by the spring ring expander 14, the lower outer ring 15 is quite similar to the upper outer ring and is likewise under no opening tension but is designed to always closely surround its inner ring.

Figure 4:
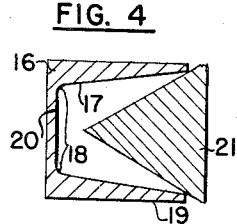
Figures 4 and 5 are transverse sectional views of alternate forms of inner rings.

In Figure 4 a modified form of inner ring 16 is shown in which the sloping sides 17 approach the inner periphery of the inner ring with the sides more nearly parallel to the outer sides of these rings. It is always desirable to have the sides join the base of the groove on the arc of a circle as shown at 18 to make the danger of breakage between the portions 19, the sides of the ring, and 20 the base of the groove, less likely. The outer wedging ring 21 will always have its wedging sides approach the sides 19 of the inner ring with a wedging action as illustrated.

Figure 5:
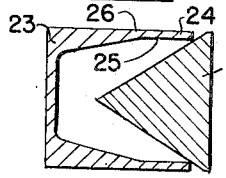

The wedging action of the inner ring 23 against the center ring 22 of Figure 5 is quite similar, although the portion of the sides of the inner ring shown at 24 has its inner face 25 parallel with its outer face 26 for a short portion of the width of the ring.

Figure 6:
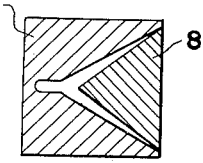
Figure 6 is a view of the ring in which the outer ring is worn flush with the inner ring.

Should the outer ring of this invention wear flush with the sides of the inner ring, as shown in Figure 6, those sides, presenting a much smaller wearing surface to the cylinder than the wide face of the outer ring, will wear back much faster, and the wedging action of the outer ring, when pressed by the inner ring, will always spread the sides of the inner ring under the tension of the inner ring on the outer ring.

It will thus be apparent that a new inner ring of one piece with a continuous circumferentially bendable inner wall is provided and in which the sides of the ring may be pushed out into contact with the piston groove when the ring is under expanding tension, by means of an outer wedge shaped ring which maintains its contact with the cylinder wall while at the same time expanding the sides of the inner ring, so that the inner ring maintains a snug contact with the piston grooves thus preventing the passage of oil upwardly and all gases downwardly beyond the rings.

It will be apparent that various other modifications may be made in the ring of this invention within the scope of the claims.

What is claimed as new and is desired to be secured by Letters Patent is:

1. A two piece split piston ring comprising an inner ring adapted to be received into the packing groove of a piston and formed on its outer periphery with an annular groove having converging inclined side walls sloping back to adjacent the inner periphery of the ring, the inner peripheral wall being continuous transversely and circumferentially between the ring ends, and circumferentially flexible between its sides, and an outer triangularly sectioned wedging ring having its wedging sides seated in said ring groove and having a larger angle at the wedge point than that between the side walls of the inner ring, the wedging ring extending outwardly beyond the inner ring, whereby the inner ring walls are spread by the wedging ring when the wedging ring is held against expansion, upon outward radial expansion of the inner ring.

2. The ring of claim 1 in which the side walls of the inner ring slope substantially toward one another and join each other in an arc of a circle.

3. The ring of claim 1 in which the wedging ring has a substantially larger outer peripheral wearing surface than that of the inner ring, whereby when said surfaces because of wear approach to flush relationship, the spreading action of the wedging ring is maintained.

No references cited.